United States Patent
Sato et al.

(10) Patent No.: US 12,355,383 B2
(45) Date of Patent: Jul. 8, 2025

(54) ELECTRONIC CONTROL DEVICE FOR VEHICLE-MOUNTED EQUIPMENT

(71) Applicant: HITACHI ASTEMO, LTD., Hitachinaka (JP)

(72) Inventors: Nobuki Sato, Hitachinaka (JP); Fumiya Iijima, Hitachinaka (JP); Nagamori Hiraki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 90 days.

(21) Appl. No.: 18/263,222

(22) PCT Filed: Dec. 29, 2021

(86) PCT No.: PCT/JP2021/049020
§ 371 (c)(1),
(2) Date: Jul. 27, 2023

(87) PCT Pub. No.: WO2022/163302
PCT Pub. Date: Aug. 4, 2022

(65) Prior Publication Data
US 2024/0322734 A1    Sep. 26, 2024

(30) Foreign Application Priority Data

Jan. 29, 2021  (JP) ................. 2021-012947

(51) Int. Cl.
*H02P 29/028* (2016.01)
*B62D 5/04* (2006.01)
(Continued)

(52) U.S. Cl.
CPC ............ *H02P 29/028* (2013.01); *B62D 5/046* (2013.01); *B62D 5/0481* (2013.01); *H02P 25/22* (2013.01);
(Continued)

(58) Field of Classification Search
None
See application file for complete search history.

(56) References Cited

U.S. PATENT DOCUMENTS 7,085,947 B2 *  8/2006  Kabune ................. G06F 1/24
                                            713/340
8,155,824 B2 *  4/2012  Sakai ............... B60W 50/0205
                                            701/29.2
(Continued)

FOREIGN PATENT DOCUMENTS

DE   102014202276 A1 *  8/2014  ......... B62D 15/0215
EP       3964424 A1 *  3/2022  ........... B62D 5/0463
(Continued)

OTHER PUBLICATIONS

Notice of Reasons for Refusal dated Mar. 12, 2024 issued in JP Application No. 2022-578199, with machine-generated English translation, 10 pages.

(Continued)

*Primary Examiner* — Kevin R Steckbauer
(74) *Attorney, Agent, or Firm* — FOLEY & LARDNER LLP

(57) ABSTRACT

An electronic control device for vehicle-mounted equipment according to the present invention includes: a first microcomputer that operates by receiving power supply through a first power source connector; a second microcomputer that operates by receiving power supply through a second power source connector; a first voltage monitoring line that connects an output end of the second power source connector and the first microcomputer; and a second voltage monitoring line that connects an output end of the first power source connector and the second microcomputer. With this configuration, both the first microcomputer and the second micro- (Continued)

computer can accurately determine the state of voltage supply to the other microcomputer.

12 Claims, 9 Drawing Sheets

(51) Int. Cl.
*H02P 25/22* (2006.01)
*H02P 29/024* (2016.01)
*H04W 4/48* (2018.01)

(52) U.S. Cl.
CPC .............. *H02P 29/025* (2013.01); *H04W 4/48* (2018.02); *B62D 5/0403* (2013.01); *B62D 5/0484* (2013.01)

(56) References Cited

U.S. PATENT DOCUMENTS

| | | | | |
|---|---|---|---|---|
| 8,717,037 | B2* | 5/2014 | Maruyama | H03M 1/1076 701/1 |
| 9,182,452 | B2* | 11/2015 | Kimura | G01R 31/40 |
| 10,003,294 | B2* | 6/2018 | Hara | H02P 29/032 |
| 10,218,302 | B2* | 2/2019 | Koseki | H02P 29/028 |
| 10,328,972 | B2* | 6/2019 | Fujita | G01D 5/14 |
| 10,439,545 | B2* | 10/2019 | Hata | B60L 3/0092 |
| 10,466,122 | B2* | 11/2019 | Nakamura | G01L 25/003 |
| 10,654,518 | B2* | 5/2020 | Sakai | B62D 5/0457 |
| 10,668,945 | B2* | 6/2020 | Taki | B62D 5/0403 |
| 10,717,462 | B2* | 7/2020 | Oka | G01D 3/08 |
| 10,903,777 | B2* | 1/2021 | Niwa | B62D 5/0487 |
| 10,981,595 | B2* | 4/2021 | Otake | B62D 5/049 |
| 11,084,523 | B2* | 8/2021 | Sasaki | B62D 5/0463 |
| 11,084,524 | B2* | 8/2021 | Fuji | B62D 5/0463 |
| 11,091,201 | B2* | 8/2021 | Fujita | G01D 5/145 |
| 11,208,143 | B2* | 12/2021 | Kawamura | H02P 6/28 |
| 11,251,732 | B2* | 2/2022 | Kawamura | H02P 6/28 |
| 11,323,058 | B2* | 5/2022 | Koseki | H02P 25/16 |
| 11,453,435 | B2* | 9/2022 | Niwa | H02P 27/00 |
| 11,472,473 | B2* | 10/2022 | Nakamura | B62D 5/0484 |
| 11,479,291 | B2* | 10/2022 | Endoh | B62D 5/046 |
| 11,496,086 | B2* | 11/2022 | Nitta | H02P 29/028 |
| 11,505,240 | B2* | 11/2022 | Kawamura | B62D 5/0403 |
| 11,820,444 | B2* | 11/2023 | Sato | B62D 5/049 |
| 12,145,665 | B2* | 11/2024 | Satou | G01R 19/16528 |
| 2002/0023241 | A1* | 2/2002 | Kabune | G06F 1/28 714/22 |
| 2006/0227606 | A1* | 10/2006 | Okamoto | G06F 13/385 365/185.11 |
| 2009/0055685 | A1* | 2/2009 | Mochida | G05B 19/0428 714/30 |
| 2009/0183018 | A1* | 7/2009 | Nakamura | B60W 50/04 713/340 |
| 2009/0193273 | A1* | 7/2009 | Kobayashi | G06F 1/32 713/320 |
| 2009/0198407 | A1* | 8/2009 | Sakai | B60W 50/0205 701/29.1 |
| 2011/0315469 | A1* | 12/2011 | Uryu | B62D 5/0487 180/443 |
| 2012/0065823 | A1* | 3/2012 | Taguchi | B60L 3/04 701/22 |
| 2012/0101655 | A1* | 4/2012 | Maruyama | H03M 1/1076 701/1 |
| 2014/0229062 | A1* | 8/2014 | Kimura | B62D 6/10 701/41 |
| 2015/0100811 | A1* | 4/2015 | Itou | G06F 1/3293 713/324 |
| 2015/0210166 | A1* | 7/2015 | Nakagawara | B60L 50/51 701/22 |
| 2016/0347326 | A1* | 12/2016 | Iwagami | B60W 10/06 |
| 2017/0346436 | A1* | 11/2017 | Hara | B62D 5/0463 |
| 2018/0043928 | A1* | 2/2018 | Fujita | H02P 29/028 |
| 2018/0058962 | A1* | 3/2018 | Nakamura | G05B 15/02 |
| 2018/0175779 | A1* | 6/2018 | Koseki | H02P 29/032 |
| 2019/0039643 | A1* | 2/2019 | Oka | B62D 6/10 |
| 2019/0140576 | A1* | 5/2019 | Hata | H02P 29/024 |
| 2019/0144029 | A1* | 5/2019 | Taki | H02P 27/06 318/3 |
| 2019/0144030 | A1* | 5/2019 | Sakai | G06F 1/12 318/3 |
| 2019/0210637 | A1* | 7/2019 | Otake | B62D 5/049 |
| 2019/0291775 | A1* | 9/2019 | Taki | B62D 5/0484 |
| 2020/0010094 | A1* | 1/2020 | Nakada | B60W 50/023 |
| 2020/0023887 | A1* | 1/2020 | Sasaki | B62D 5/0493 |
| 2020/0070874 | A1* | 3/2020 | Niwa | H02P 29/024 |
| 2020/0076348 | A1* | 3/2020 | Niwa | B62D 5/0463 |
| 2020/0114964 | A1* | 4/2020 | Kim | B60W 10/20 |
| 2020/0140005 | A1* | 5/2020 | Fuji | B62D 5/0463 |
| 2020/0172153 | A1* | 6/2020 | Kawamura | B62D 5/0403 |
| 2020/0198696 | A1* | 6/2020 | Kawamura | H02P 6/28 |
| 2020/0207406 | A1* | 7/2020 | Endoh | B62D 5/0481 |
| 2020/0247465 | A1* | 8/2020 | Nakamura | B62D 5/0487 |
| 2020/0331522 | A1* | 10/2020 | Yamashita | B62D 5/046 |
| 2021/0253047 | A1* | 8/2021 | Okada | B60R 16/0238 |
| 2022/0045642 | A1* | 2/2022 | Koseki | H02M 1/32 |
| 2022/0077809 | A1* | 3/2022 | Nitta | B62D 5/0463 |
| 2022/0111889 | A1* | 4/2022 | Sato | B62D 5/046 |
| 2023/0029564 | A1* | 2/2023 | Satou | G01R 19/16528 |
| 2024/0322734 | A1* | 9/2024 | Sato | B62D 5/0481 |

FOREIGN PATENT DOCUMENTS

| | | | | |
|---|---|---|---|---|
| JP | H10-297395 A | | 11/1998 | |
| JP | 2011195089 A | * | 10/2011 | |
| JP | 2012-025372 A | | 2/2012 | |
| JP | 2019-004682 A | | 1/2019 | |
| JP | 2023018750 A | * | 2/2023 | ............ B60R 16/033 |
| JP | 7388410 B2 | * | 11/2023 | ............ B60R 16/033 |
| WO | WO-2018/173561 A1 | | 9/2018 | |
| WO | WO-2020179818 A1 | * | 9/2020 | ........ H02M 7/53871 |
| WO | WO-2022163302 A1 | * | 8/2022 | ............ B62D 5/046 |

OTHER PUBLICATIONS

International Preliminary Report on Patentability and Written Opinion dated Aug. 10, 2023 issued in International Patent Application No. PCT/JP2021/049020, with English translation, 10 pages.

International Search Report dated Mar. 29, 2022 issued in International Application No. PCT/JP2021/049020, with English translation, 4 pages.

* cited by examiner

ELECTRONIC CONTROL DEVICE FOR VEHICLE-MOUNTED EQUIPMENT

TECHNICAL FIELD

The present invention relates to an electronic control device for vehicle-mounted equipment.

BACKGROUND ART

A motor control device disclosed in Patent Document 1 includes: a plurality of motor drive circuits that drive one or more motors; and a plurality of microcomputers, each of which operates by power generated by a power generation circuit that is connected to a power source, and has a drive signal generation unit that generates a motor drive signal for instructing each of the plurality of motor drive circuits.

At least one of the microcomputers has a stoppage judgement unit for judging that the operation of the one microcomputer is going to be stopped and transmitting the information as a stoppage judgement signal to another microcomputer. A microcomputer that receives the stoppage judgement signal from one or more other microcomputers actually stops its own operation on the basis of at least the stoppage judgement signal of the other microcomputer.

REFERENCE DOCUMENT LIST

Patent Document

Patent Document 1: JP 2019-004682 A

SUMMARY OF THE INVENTION

Problem to be Solved by the Invention

In an electronic control device that controls vehicle-mounted equipment such as an electric power steering system, in some cases, a first microcomputer and a second microcomputer are provided to have redundancy.

In such an electronic control device, if power is supplied to the first microcomputer from a power source such as a battery via a first power source connector and power is supplied to the second microcomputer from the power source via a second power source connector, for example, the first microcomputer is reset by disconnection of the first power source connector or voltage fluctuation in the power source, and is also reset by a failure in a power supply circuit that converts and supplies a source voltage to the first microcomputer.

However, it is difficult to accurately determine the state of voltage supply to the communication partner on the basis of communication between the first microcomputer and the second microcomputer, and controllability of the vehicle-mounted equipment cannot be improved when one of the first microcomputer and the second microcomputer has been reset.

The present invention has been made in view of such conventional circumstances, and an object of the present invention is to provide an electronic control device for vehicle-mounted equipment in which, in a redundant electronic control device including first and second power source connectors and first and second microcomputers, each of the first and second microcomputers can accurately determine the state of voltage supply to the other party.

Means for Solving the Problem

One aspect of an electronic control device for vehicle-mounted equipment according to the present invention includes: a first power source connector and a second power source connector that connect to a power source; a control unit that controls the vehicle-mounted equipment, the control unit including a first microcomputer that operates by receiving power supply through the first power source connector, and a second microcomputer that operates by receiving power supply through the second power source connector; a first voltage monitoring line that connects an output end of the second power source connector and the first microcomputer; and a second voltage monitoring line that connects an output end of the first power source connector and the second microcomputer.

Effects of the Invention

According to the present invention, each of a first microcomputer and a second microcomputer can accurately determine the state of voltage supply to the other microcomputer.

MODE FOR CARRYING OUT THE INVENTION

Hereinafter, an embodiment of an electronic control device for vehicle-mounted equipment according to the present invention will be described with reference to the drawings.

Figure 1:
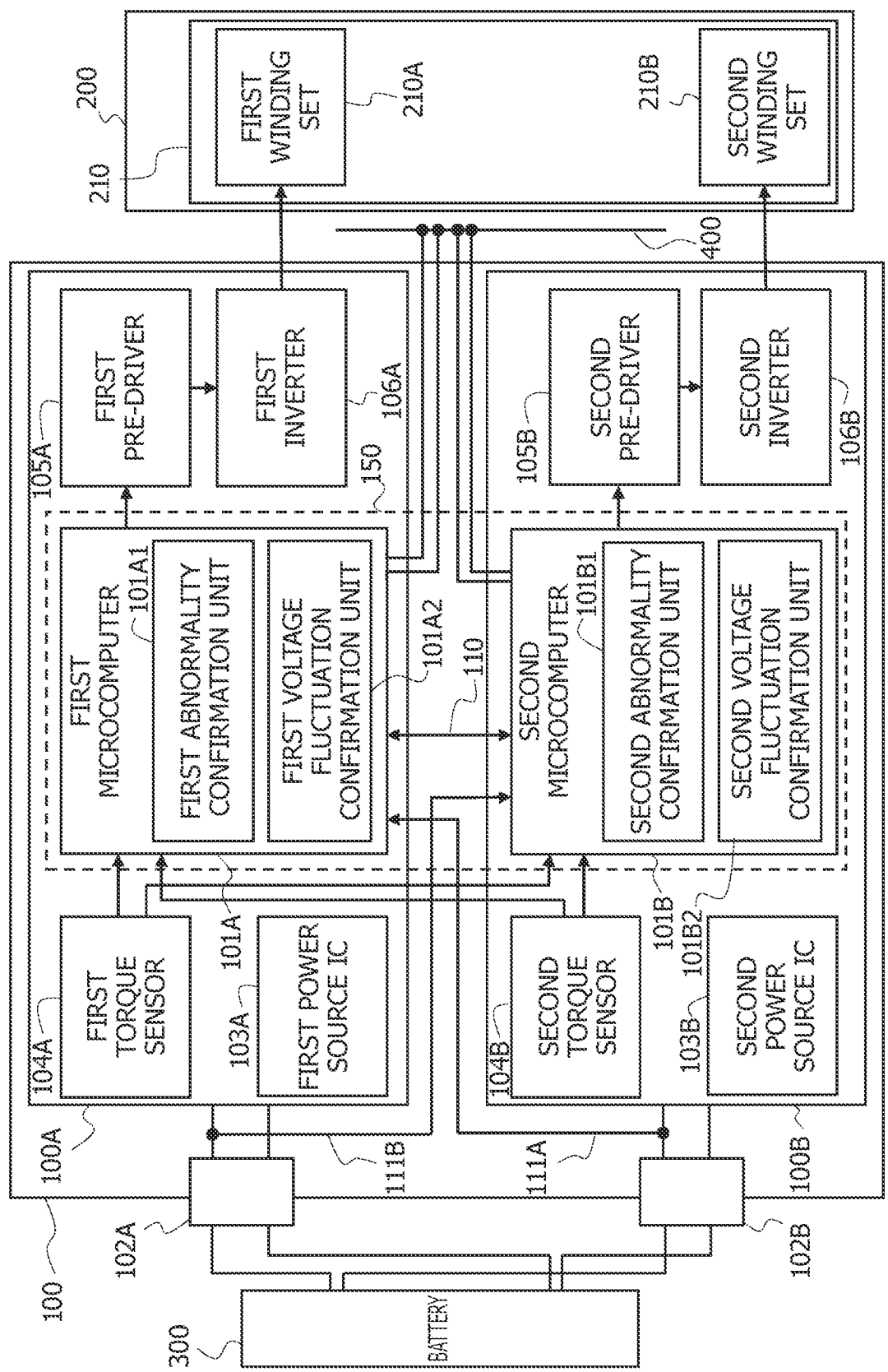
FIG. 1 is a block diagram illustrating a mode of an electronic control device for vehicle-mounted equipment.

FIG. 1 is a block diagram illustrating a mode of the electronic control device for vehicle-mounted equipment, in which the vehicle-mounted equipment is an electric power steering system.

An electronic control device 100 is a control device including a microcomputer (i.e., microprocessor or microcontroller), and controls the steering assist power (or steering power) in an electric power steering system 200.

Specifically, electric power steering system 200 includes an electric motor 210 for generating the steering assist power, and electronic control device 100 (i.e., EPS controller) controls driving of electric motor 210 to control the steering assist power.

Electric motor 210 is a 3-phase brushless motor including two winding sets of a first winding set 210A and a second winding set 210B, each winding set having a U-phase, a V-phase, and a W-phase.

In electronic control device 100, a controller 150 that controls electric power steering system 200 includes a first microcomputer 101A that controls energization of first winding set 210A and a second microcomputer 101B that controls energization of second winding set 210B so as to have redundancy.

That is, driving of first winding set 210A is controlled by a control command from first microcomputer 101A, and driving of second winding set 210B is controlled by a control command from second microcomputer 101B.

Here, a first control system 100A that controls driving of first winding set 210A has, in addition to first microcomputer 101A, a first power source connector 102A, a first power source IC 103A as a first power supply circuit, a first torque sensor 104A as a first sensor, a first pre-driver 105A, and a first inverter 106A.

Similarly, a second control system 100B that controls driving of second winding set 210B has, in addition to second microcomputer 101B, a second power source connector 102B, a second power source IC 103B as a second power supply circuit, a second torque sensor 104B as a second sensor, a second pre-driver 105B, and a second inverter 106B.

A battery 300 which is an external power source is connected to the input end of first power source connector 102A and second power source connector 102B.

Then, first power source IC 103A is connected to the output end of first power source connector 102A and second power source IC 103B is connected to the output end of second power source connector 102B.

First power source IC 103A converts a source voltage from battery 300 into an operating voltage of each of the units of first control system 100A, and supplies the converted voltage to first microcomputer 101A and the like.

Similarly, second power source IC 103B converts the source voltage from battery 300 into an operating voltage of each of the units of second control system 100B, and supplies the converted voltage to second microcomputer 101B and the like.

That is, first microcomputer 101A of first control system 100A operates by receiving power supply through first power source connector 102A, and second microcomputer 101B of second control system 100B operates by receiving power supply through second power source connector 102B.

First torque sensor 104A and second torque sensor 104B form a sensor unit capable of detecting a physical quantity of electric power steering system 200, and detect a steering torque of a steering wheel (not illustrated) to output a signal corresponding to the steering torque.

First torque sensor 104A and second torque sensor 104B include a sensor element and a simple microcomputer.

First microcomputer 101A sends a command signal for requesting transmission of a steering torque detection signal to first torque sensor 104A, and similarly, second microcomputer 101B sends a command signal for requesting transmission of a steering torque detection signal to second torque sensor 104B.

Then, first torque sensor 104A issues a steering torque detection signal when receiving the command signal from first microcomputer 101A, and second torque sensor 104B issues a steering torque detection signal when receiving the command signal from second microcomputer 101B.

That is, first torque sensor 104A is the first sensor that operates in response to a command from first microcomputer 101A, and second torque sensor 104B is the second sensor that operates in response to a command from second microcomputer 101B.

Here, first microcomputer 101A acquires the steering torque detection signal issued by first torque sensor 104A and the steering torque detection signal issued by second torque sensor 104B.

Similarly, second microcomputer 101B acquires the steering torque detection signal issued by first torque sensor 104A and the steering torque detection signal issued by second torque sensor 104B.

Then, first microcomputer 101A calculates a control signal to be output to a first pre-driver 301A on the basis of the acquired steering torque detection signal and the like, and second microcomputer 101B calculates a control signal to be output to a second pre-driver 301B on the basis of the acquired steering torque detection signal and the like.

First pre-driver 105A and first inverter 106A control energization of first winding set 210A on the basis of the control signal generated by first microcomputer 101A, and second pre-driver 105B and second inverter 106B control energization of second winding set 210B on the basis of the control signal generated by second microcomputer 101B.

Specifically, first pre-driver 105A controls ON/OFF of a switching element forming first inverter 106A on the basis of the control signal from first microcomputer 101A, and controls energization of each winding of first winding set 210A under the control of the switching element of first inverter 106A.

Second pre-driver 105B controls ON/OFF of a switching element forming second inverter 106B on the basis of the control signal from second microcomputer 101B, and controls energization of each winding of second winding set 210B under the control of the switching element of second inverter 106B.

Then, electric motor 210 is driven according to the current of first winding set 210A and second winding set 210B to generate motor torque, or in other words, steering assist power.

First microcomputer 101A and second microcomputer 101B are capable of communicating with each other.

Note that the communication between first microcomputer 101A and second microcomputer 101B is onboard serial communication that is performed by connecting first microcomputer 101A and second microcomputer 101B by a dedicated line 110, and is performed by using a scheme such as the SPI (serial peripheral interface), for example.

Electronic control device 100 includes a first voltage monitoring line 111A that connects the output end of second power source connector 102B and first microcomputer 101A, and a second voltage monitoring line 111B that connects the output end of first power source connector 102A and second microcomputer 101B.

Then, first microcomputer 101A uses first voltage monitoring line 111A to monitor the source voltage supplied to second control system 100B via second power source connector 102B. Similarly, second microcomputer 101B uses second voltage monitoring line 111B to monitor the source voltage supplied to first control system 100A via first power source connector 102A.

Furthermore, first microcomputer 101A and second microcomputer 101B are connected to an in-vehicle network 400.

That is, first microcomputer 101A and second microcomputer 101B include an interface for connecting to in-vehicle network 400.

As a result, first microcomputer 101A can exchange information signals with other microcomputers including second microcomputer 101B that are connected to in-vehicle network 400. Similarly, second microcomputer 101B can exchange information signals with other microcomputers including first microcomputer 101A that are connected to in-vehicle network 400.

In-vehicle network 400 is a network in which microcomputers can exchange information signals by serial communication such as a CAN (controller area network) bus.

In the above-described electronic control device 100, first microcomputer 101A includes, as software, functions of a first abnormality confirmation unit 101A1 that confirms abnormality of second microcomputer 101B or second power source IC 103B, and a first voltage fluctuation confirmation unit 101A2 that confirms fluctuation of the voltage supplied to second microcomputer 101B.

In addition, second microcomputer 101B includes, as software, functions of a second abnormality confirmation unit 101B1 that confirms abnormality of first microcomputer 101A or first power source IC 103A, and a second voltage fluctuation confirmation unit 101B2 that confirms fluctuation of the voltage supplied to first microcomputer 101A.

In other words, first microcomputer 101A distinguishes whether a reset state of second microcomputer 101B is due to failure of second microcomputer 101B or second power source IC 103B, or due to fluctuation of the voltage supplied to second microcomputer 101B.

Similarly, second microcomputer 101B distinguishes whether a reset state of first microcomputer 101A is due to failure of first microcomputer 101A or first power source IC 103A, or due to fluctuation of the voltage supplied to first microcomputer 101A.

Figure 2:
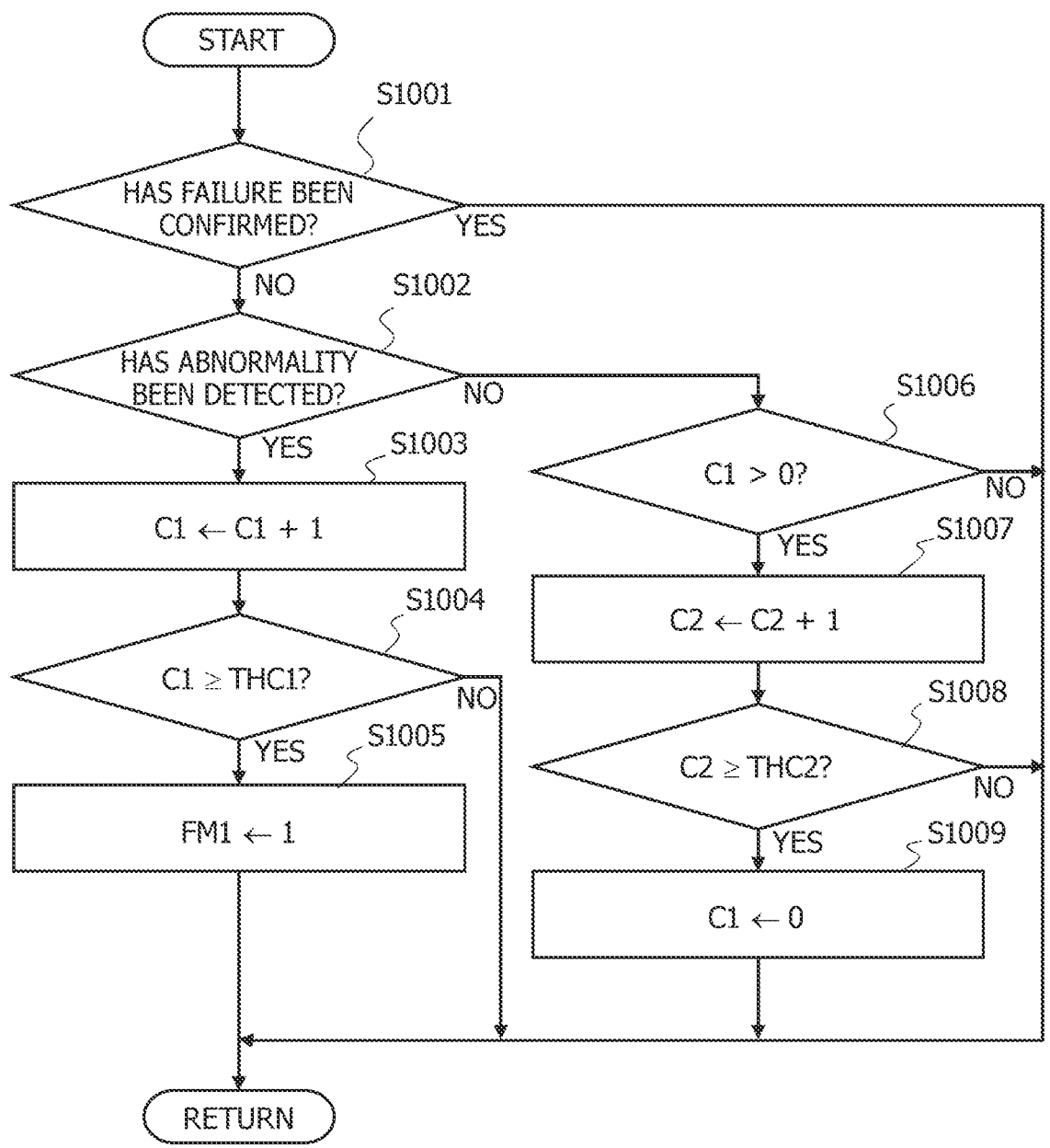
FIG. 2 is a flowchart illustrating a function of a first abnormality confirmation unit.

A flowchart of FIG. 2 illustrates the function of first abnormality confirmation unit 101A1 included in first microcomputer 101A.

Note that the function of second abnormality confirmation unit 101B1 included in second microcomputer 101B is the same as the function of first abnormality confirmation unit 101A1, and therefore, detailed description of second abnormality confirmation unit 101B1 will be omitted.

In step S1001, first microcomputer 101A, or more specifically, first abnormality confirmation unit 101A1 determines whether or not a reset state of second microcomputer 101B due to abnormality of second microcomputer 101B or second power source IC 103B has been confirmed.

Then, if the above reset state has been confirmed, first microcomputer 101A terminates the routine.

If the reset state of second microcomputer 101B due to abnormality of second microcomputer 101B or second power source IC 103B has not been confirmed, first microcomputer 101A proceeds to step S1002.

In step S1002, first microcomputer 101A determines whether or not second microcomputer 101B has been reset due to abnormality of second microcomputer 101B or second power source IC 103B.

Specifically, in step S1002, first microcomputer 101A determines whether or not communication with second microcomputer 101B via dedicated line 110 is normal, whether or not the output signal of second torque sensor 104B is normal, and whether or not the voltage at the output end of second power source connector 102B monitored using first voltage monitoring line 111A is normal voltage.

Here, in the case of communication with second microcomputer 101B being abnormal and the output signal of second torque sensor 104B being abnormal even though the voltage at the output end of second power source connector 102B, that is, supply of the source voltage to second control system 100B is normal, first microcomputer 101A determines that second microcomputer 101B has been reset due to abnormality of second microcomputer 101B or second power source IC 103B, and proceeds to step S1003.

For example, even when the voltage at the output end of second power source connector 102B is normal, if second power source IC 103B fails and the output voltage of second power source IC 103B becomes abnormal, the voltage supplied to second microcomputer 101B becomes abnormal and second microcomputer 101B is reset. Additionally, second microcomputer 101B is reset due to failure of second microcomputer 101B itself.

Then, when second microcomputer 101B is reset, first microcomputer 101A can no longer communicate normally with second microcomputer 101B.

Additionally, second torque sensor 104B issues a steering torque detection signal when receiving a command signal from second microcomputer 101B, and therefore goes into an abnormal state of not issuing the output signal when second microcomputer 101B is reset.

Accordingly, in the case of communication with second microcomputer 101B being abnormal and the output signal of second torque sensor 104B being abnormal even though the voltage at the output end of second power source connector 102B is normal, first microcomputer 101A can presume that second microcomputer 101B has been reset due to abnormality of second power source IC 103B or second microcomputer 101B.

Assume a case in which poor connection of second power source connector 102B such as disconnection of second power source connector 102B causes a drop in the voltage at the output end of second power source connector 102B, and thereby a drop in the output voltage of second power source IC 103B. In this case, too, first microcomputer 101A can no longer communicate normally with second microcomputer 101B, and the output signal of second torque sensor 104B becomes abnormal.

However, first microcomputer 101A monitors the voltage at the output end of second power source connector 102B by first voltage monitoring line 111A, and therefore can distinguish between communication abnormality and output abnormality of second torque sensor 104B due to poor connection of second power source connector 102B and communication abnormality and output abnormality of second torque sensor 104B due to abnormality of second power source IC 103B or second microcomputer 101B.

After determining that second microcomputer 101B has been reset due to abnormality of second power source IC 103B or second microcomputer 101B and proceeding to step S1003, first microcomputer 101A executes addition processing (C1←C1+1) on the value of an abnormality counter C1.

As will be described later, first microcomputer 101A detects the continued time (continued period) in which it is determined that second microcomputer 101B is in a reset state on the basis of the value of abnormality counter C1.

Note that abnormality counter C1 is a value of zero or more, and the initial value is zero.

In the next step S1004, first microcomputer 101A compares the value of abnormality counter C1 after the addition processing in step S1003 and a predetermined value THC1 (THC1>0), and determines whether or not the value of abnormality counter C1 is equal to or greater than predetermined value THC1, or in other words, whether or not the reset state of second microcomputer 101B is continued for a predetermined time (i.e., predetermined period) or more.

Here, if the value of abnormality counter C1 is less than predetermined value THC1 (C1<THC1), first microcomputer 101A terminates the routine without confirming that second microcomputer 101B has been reset due to abnormality of second power source IC 103B or second microcomputer 101B.

On the other hand, if the value of abnormality counter C1 is equal to or greater than predetermined value THC1, first microcomputer 101A proceeds to step S1005, raises a failure confirmation flag FM1, and confirms the determination that second microcomputer 101B has been reset due to abnormality of second power source IC 103B or second microcomputer 101B.

Additionally, in step S1002, when first microcomputer 101A determines that the abnormality determination conditions, specifically, the voltage at the output end of second power source connector 102B being normal, communication with the second microcomputer 101B being normal, and output signal of the second torque sensor 104B being abnormal, are not satisfied, first microcomputer 101A proceeds to step S1006.

In step S1006, first microcomputer 101A determines whether or not the value of abnormality counter C1 has exceeded zero (C1>0).

Then, first microcomputer 101A proceeds to step S1007 if the value of abnormality counter C1 has exceeded zero, and terminates the routine if the value of abnormality counter C1 is the initial value zero.

Here, if the above abnormality determination conditions are no longer satisfied at any time between after the abnormality determination conditions are satisfied and before the value of abnormality counter C1 reaches predetermined value THC1, that is, before the failure is confirmed, first microcomputer 101A determines that the value of abnormality counter C1 has exceeded zero in step S1006.

On the other hand, if the state in which the abnormality determination conditions are not satisfied is being continued, first microcomputer 101A determines that the value of abnormality counter C1 is zero in step S1006.

In step S1007, first microcomputer 101A executes addition processing (C2←C2+1) on the value of a normality counter C2.

Note that normality counter C2 is a value of zero or more, and the initial value is zero.

Next, first microcomputer 101A proceeds to step S1008, and determines whether or not the value of normality counter C2 is equal to or greater than a predetermined value THC2 (THC2>0).

In a case in which the value of normality counter C2 is less than predetermined value THC2 and a predetermined time has not elapsed from when the abnormality determination conditions are no longer satisfied, first microcomputer 101A terminates the routine.

On the other hand, in a case in which the value of normality counter C2 is equal to or greater than predetermined value THC2 and the predetermined time has elapsed from when the abnormality determination conditions are no longer satisfied, or in other words, if the state in which the abnormality determination conditions are not satisfied is being continued for a predetermined time, first microcomputer 101A proceeds to step S1009 and resets abnormality counter C1 to the initial value zero.

As described above, first microcomputer 101A, or more specifically, first abnormality confirmation unit 101A1 diagnoses whether or not second microcomputer 101B has been reset due to abnormality of second power source IC 103B or second microcomputer 101B on the basis of the voltage at the output end of second power source connector 102B, the state of communication with second microcomputer 101B, and the output state of second torque sensor 104B.

Similarly, second microcomputer 101B, or more specifically, second abnormality confirmation unit 101B1, diagnoses whether or not first microcomputer 101A has been reset due to failure of first power source IC 103A or first microcomputer 101A on the basis of the voltage at the output end of first power source connector 102A, the state of communication with first microcomputer 101A, and the output state of first torque sensor 104A.

Figure 3:
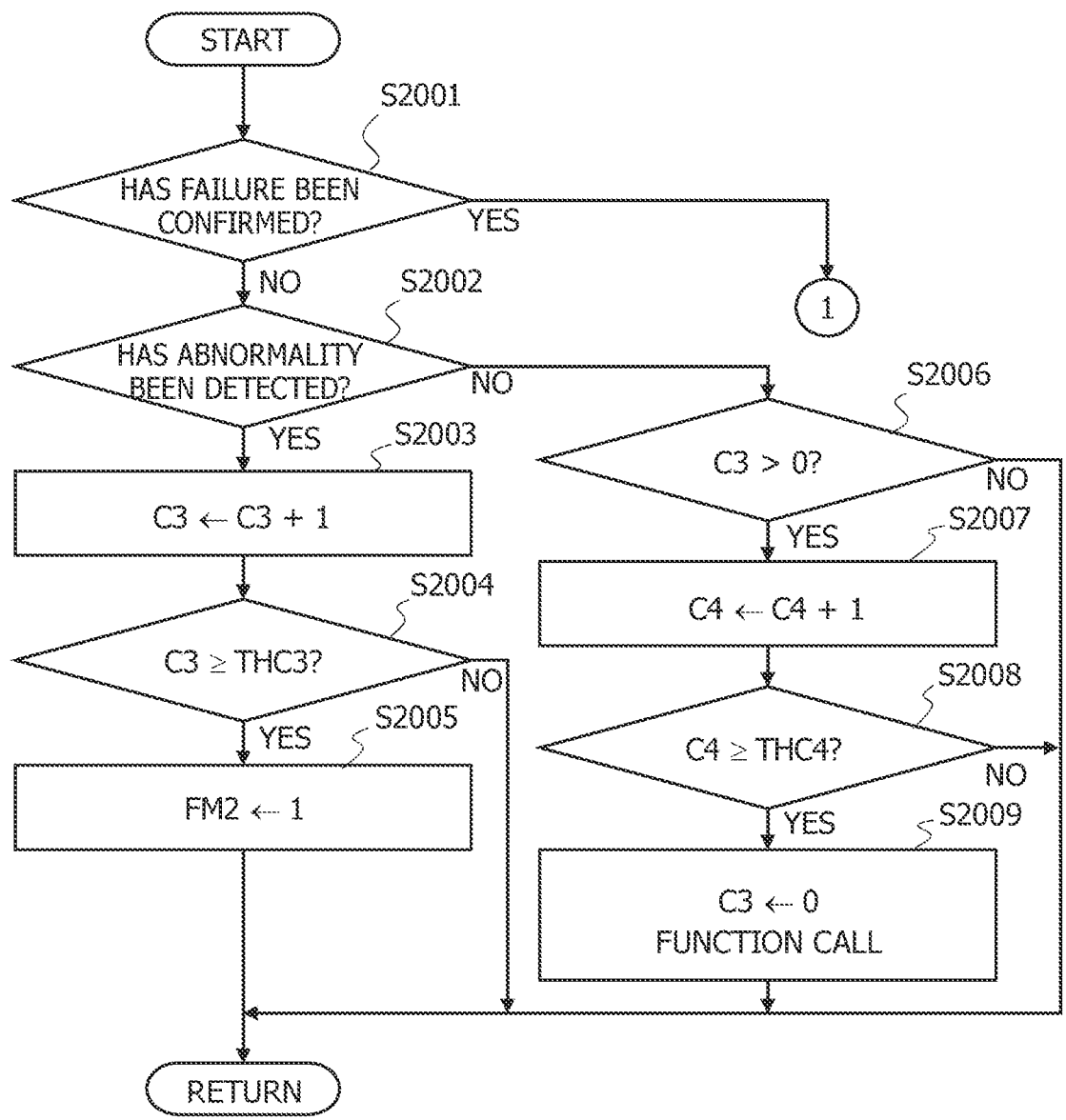
FIG. 3 is a flowchart illustrating a function of a first voltage fluctuation confirmation unit.
Figure 4:
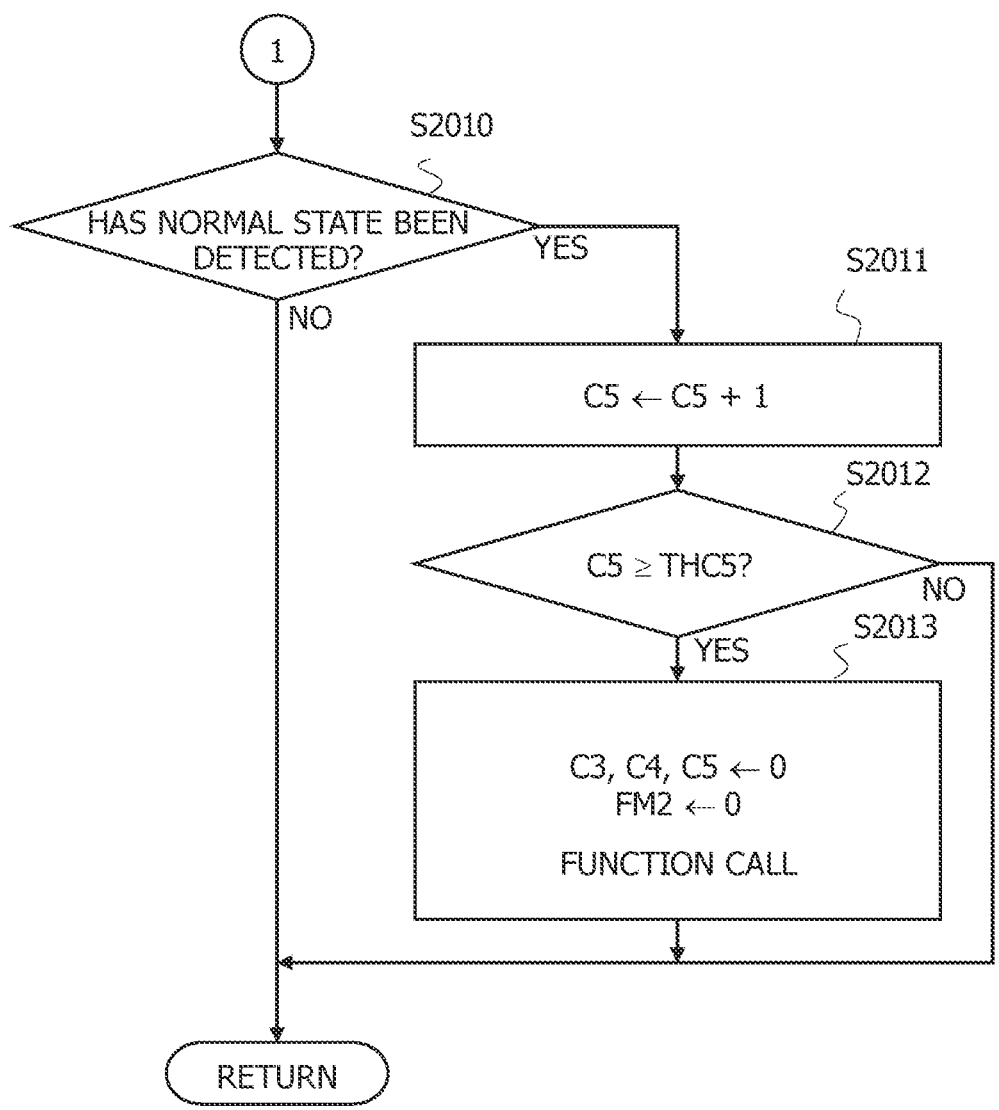
FIG. 4 is a flowchart illustrating a function of the first voltage fluctuation confirmation unit.

Flowcharts of FIG. 3 and FIG. 4 illustrate the function of first voltage fluctuation confirmation unit 101A2 included in first microcomputer 101A.

Note that the function of second voltage fluctuation confirmation unit 101B2 included in second microcomputer 101B is the same as the function of first voltage fluctuation confirmation unit 101A2, and therefore detailed description of the function of second voltage fluctuation confirmation unit 101B2 will be omitted.

In step S2001, first microcomputer 101A, or more specifically, first voltage fluctuation confirmation unit 101A2 determines whether or not a reset state of second microcomputer 101B due to low voltage has been confirmed.

If the reset state of second microcomputer 101B due to low voltage has been confirmed, first microcomputer 101A proceeds to step S2010.

Since the reset state of second microcomputer 101B due to low voltage may be cancelled by voltage recovery, if the reset state has been confirmed, first microcomputer 101A proceeds to step S2010 and subsequent steps and determines whether or not the reset state of second microcomputer 101B has been cancelled.

On the other hand, if the reset state of second microcomputer 101B due to low voltage has not been confirmed, first microcomputer 101A proceeds to step S2002 and subsequent steps and diagnoses the reset state of second microcomputer 101B due to low voltage.

In step S2002, first microcomputer 101A determines whether or not second microcomputer 101B has been reset due to a drop in voltage supply.

Specifically, in step S2002, first microcomputer 101A determines whether or not communication with second microcomputer 101B via dedicated line 110 is normal, whether or not the output signal of second torque sensor 104B is normal, and whether or not the voltage at the output end of second power source connector 102B monitored using first voltage monitoring line 111A, or in other words, voltage supply to second power source IC 103B is normal voltage.

Here, in the case of the voltage at the output end of second power source connector 102B being lower than normal voltage, communication with second microcomputer 101B being abnormal, and the output signal of second torque sensor 104B being abnormal, first microcomputer 101A determines that second microcomputer 101B has been reset due to low voltage, and proceeds to step S2003.

When the voltage at the output end of second power source connector 102B becomes lower than normal voltage due to disconnection or poor electrical contact of second power source connector 102B, a voltage drop in battery 300, and the like, the voltage supplied to second microcomputer 101B from second power source IC 103B becomes lower than the normal voltage and second microcomputer 101B is reset.

Then, when second microcomputer 101B is reset, communication with first microcomputer 101A becomes abnormal, and second torque sensor 104B that receives a command signal from second microcomputer 101B goes into an abnormal state of not issuing an output signal.

Accordingly, in the case of the voltage at the output end of second power source connector 102B being lower than normal voltage, communication with second microcomputer 101B being abnormal, and the output signal of second torque sensor 104B being abnormal, first microcomputer 101A determines that second microcomputer 101B has been reset due to low voltage.

That is, first microcomputer 101A monitors the voltage at the output end of second power source connector 102B using first voltage monitoring line 111A, and therefore can distinguish whether abnormality of communication with second microcomputer 101B and output abnormality of second torque sensor 104B is due to abnormality of second power source IC 103B or second microcomputer 101B, or is due to voltage fluctuation caused by disconnection of second power source connector 102B and the like.

After determining that second microcomputer 101B has been reset due to low voltage and proceeding to step S2003, first microcomputer 101A executes addition processing (C3←C3+1) on the value of an abnormality counter C3.

As will be described later, first microcomputer 101A detects the continued time (continued period) in which it is determined that second microcomputer 101B is in a reset state due to low voltage on the basis of the value of abnormality counter C3.

Note that abnormality counter C3 is a value of zero or more, and the initial value is zero.

In the next step S2004, first microcomputer 101A compares the value of abnormality counter C3 after the addition processing in step S2003 and a predetermined value THC3 (THC3>0), and determines whether or not the value of abnormality counter C3 is equal to or greater than predetermined value THC3, or in other words, whether or not the reset state of second microcomputer 101B due to low voltage is continued for a predetermined time.

Here, if the value of abnormality counter C3 is less than predetermined value THC3, first microcomputer 101A terminates the routine without confirming the reset state of second microcomputer 101B due to low voltage.

On the other hand, if the value of abnormality counter C3 is equal to or greater than predetermined value THC3, first microcomputer 101A proceeds to step S2005, raises a failure confirmation flag FM2, and confirms the reset state of second microcomputer 101B due to low voltage.

That is, first microcomputer 101A confirms the reset state of second microcomputer 101B due to low voltage when the state in which it is determined that second microcomputer 101B is in a reset state due to low voltage is continued for a predetermined time.

Additionally, in step S2002, when first microcomputer 101A determines that the abnormality determination conditions, specifically, voltage at the output end of second power source connector 102B being lower than the normal voltage, communication with second microcomputer 101B being abnormal, and the output signal of second torque sensor 104B being abnormal, are not satisfied, first microcomputer 101A proceeds to step S2006.

In step S2006, first microcomputer 101A determines whether or not the value of abnormality counter C3 has exceeded zero (C3>0).

Then, first microcomputer 101A proceeds to step S2007 if the value of abnormality counter C3 has exceeded zero, and terminates the routine if the value of abnormality counter C3 is the initial value zero.

Here, "value of abnormality counter C3 has exceeded zero" refers to the case of no longer satisfying the abnormality determination conditions at any time between after the abnormality determination conditions, or more specifically, the determination conditions for resetting due to voltage fluctuation, are satisfied and before the value of abnormality counter C3 reaches predetermined value THC3, that is, before the failure is confirmed.

On the other hand, "value of abnormality counter C3 is zero" refers to the case in which the state in which the abnormality determination conditions are not satisfied is being continued.

In step S2007, first microcomputer 101A executes addition processing (C4←C4+1) on the value of a normality counter C4.

Note that normality counter C4 is a value of zero or more, and the initial value is zero.

Next, first microcomputer 101A proceeds to step S2008, and determines whether or not the value of normality counter C4 is equal to or greater than a predetermined value THC4 (THC4>0).

Then, in a case in which the value of normality counter C4 is less than predetermined value THC4 and a predetermined time has not elapsed from when the abnormality determination conditions are no longer satisfied, first microcomputer 101A terminates the routine.

On the other hand, in a case in which the value of normality counter C4 is equal to or greater than predetermined value THC4 and the predetermined time has elapsed from when the abnormality determination conditions are no longer satisfied, first microcomputer 101A proceeds to step S2009.

In step S2009, first microcomputer 101A resets abnormality counter C3 to the initial value zero, and generates an interrupt of processing for setting a low voltage determination flag FLV2 of second control system 100B (second microcomputer 101B).

Figure 5:
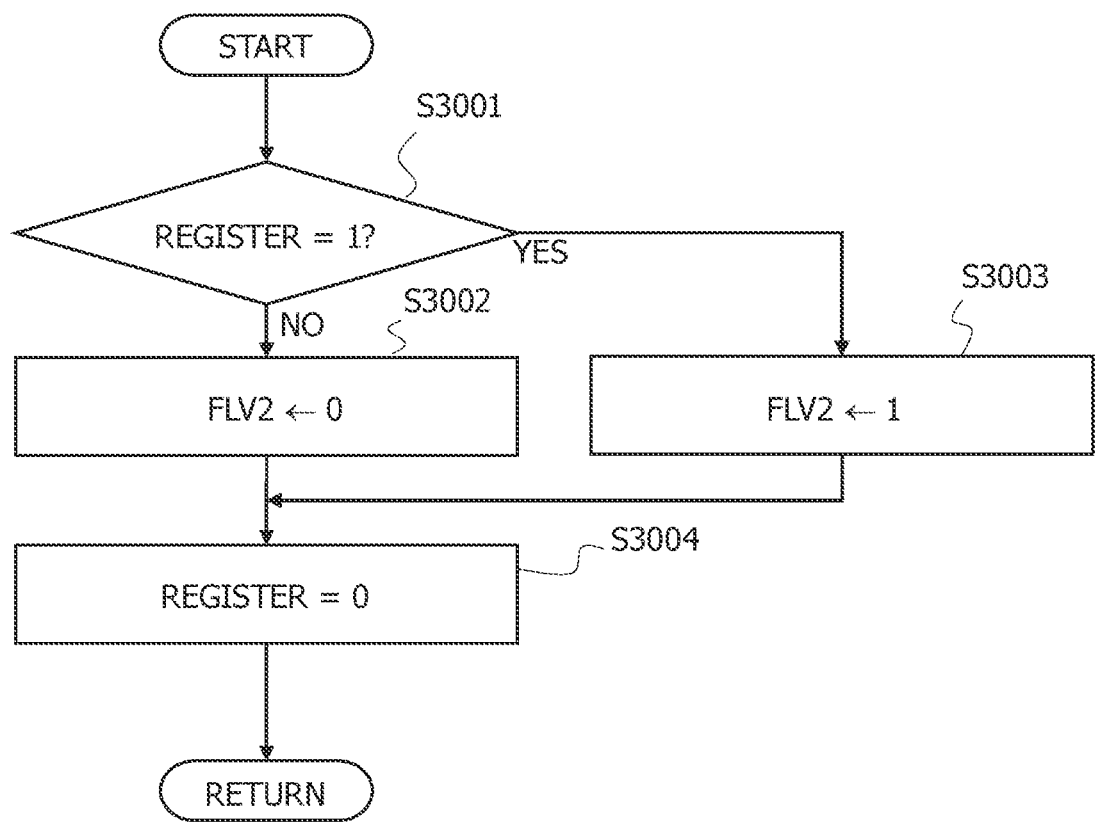
FIG. 5 is a flowchart illustrating low voltage determination processing.

A flowchart of FIG. 5 illustrates low voltage determination flag FLV2 setting processing executed in the interrupt in step S2009.

Note that the processing illustrated in the flowchart of FIG. 5 is executed in the interrupt in step S2009, that is, interrupt source register=0, and is executed when the voltage at the output end of second power source connector 102B becomes lower than normal voltage, that is, interruption source register=1.

In step S3001, first microcomputer 101A determines the interrupt source.

Then, if zero is set in the interrupt source register, that is, if the interrupt is based on a determination that the voltage at the output end of second power source connector 102B has returned to normal voltage, first microcomputer 101A proceeds to step S3002 and resets low voltage determination flag FLV2 of second control system 100B to zero.

On the other hand, if 1 is set in the interrupt source register, that is, if the interrupt is based on the fact that the voltage at the output end of second power source connector 102B has become lower than normal voltage, first microcomputer 101A proceeds to step S3003 and raises low voltage determination flag FLV2 of second control system 100B to 1.

After the processing of step S3002 or step S3003, first microcomputer 101A proceeds to step S3004 and resets the interrupt source register to zero.

That is, first microcomputer 101A raises low voltage determination flag FLV2 zto 1 when determining that the voltage at the output end of second power source connector 102B monitored using first voltage monitoring line 111A is lower than normal voltage, and resets low voltage determination flag FLV2 to zero when the state in which the voltage has returned to normal voltage continues for a predetermined time.

Additionally, after determining in step S2001 that the reset state of second microcomputer 101B due to low voltage has been confirmed, first microcomputer 101A proceeds to step S2010, and determines whether or not the normal state, specifically, the voltage at the output end of second power source connector 102B being normal voltage, communication with second microcomputer 101B being normal, and the output signal of second torque sensor 104B being normal, has returned.

For example, when connection of second power source connector 102B recovers from the state in which the voltage at the output end of second power source connector 102B had become lower than normal voltage due to disconnection of second power source connector 102B, and the voltage at the output end of second power source connector 102B returns to normal voltage, second microcomputer 101B is activated.

When second microcomputer 101B is activated, first microcomputer 101A is allowed to communicate normally with second microcomputer 101B and is allowed to normally acquire the output signal of second torque sensor 104B.

In step S2010, when determining that the normal state has not been recovered, first microcomputer 101A terminates the routine, and when determining that the normal state has been recovered, first microcomputer 101A proceeds to step S2011.

In step S2011, first microcomputer 101A executes addition processing (C5←C5+1) on the value of a normality counter C5.

Note that normality counter C5 is a value of zero or more, and the initial value is zero.

Next, first microcomputer 101A proceeds to step S2012 and determines whether or not the value of normality counter C5 is equal to or greater than a predetermined value THC5 (THC5>0).

If the value of normality counter C5 is less than predetermined value THC5 and a predetermined time has not elapsed after returning to the normal state, first microcomputer 101A terminates the routine.

On the other hand, if the value of normality counter C5 is equal to or greater than predetermined value THC5 and the predetermined time has elapsed after returning to the normal state, first microcomputer 101A proceeds to step S2013.

In step S2013, first microcomputer 101A clears all of abnormality counter C3, normality counter C4, normality counter C5, and failure confirmation flag FM2, and further generates an interrupt for processing of setting low voltage determination flag FLV2.

That is, first microcomputer 101A cancels the confirmation of voltage fluctuation when a predetermined period has continued after the voltage supplied to second microcomputer 101B has returned to normal.

The low voltage determination flag FLV2 setting processing is executed according to the flowchart of FIG. 5 described earlier, and in the interrupt in step S2013, that is, interrupt source register=0, low voltage determination flag FLV2 is reset to zero.

Note that as is the case with first voltage fluctuation confirmation unit 101A2 of first microcomputer 101A described earlier, in the case of the voltage at the output end of first power source connector 102A being lower than normal voltage, communication with first microcomputer 101A being abnormal, and the output signal of first torque sensor 104A being abnormal, second voltage fluctuation confirmation unit 101B2 of second microcomputer 101B determines that first microcomputer 101A has been reset due to low voltage. Then, when the reset state continues for a predetermined period, second voltage fluctuation confirmation unit 101B2 confirms the reset state.

Figure 6:
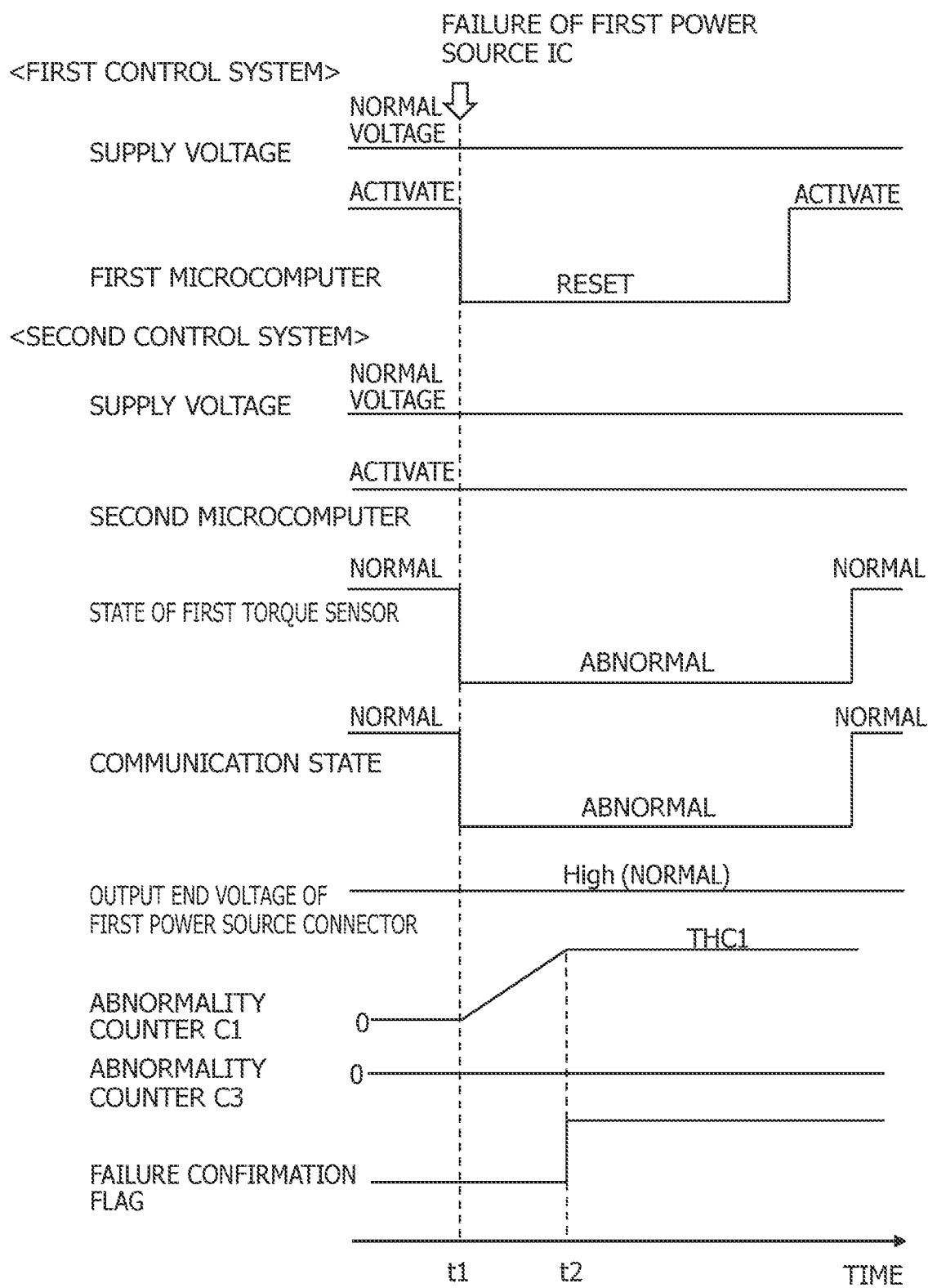
FIG. 6 is a time chart illustrating diagnosis by a second abnormality confirmation unit.

FIG. 6 is a time chart illustrating diagnosis by second microcomputer 101B, or more specifically, second abnormality confirmation unit 101B1 when first microcomputer 101A has been reset due to failure of first power source IC 103A or first microcomputer 101A.

At time t1, when abnormality occurs in first power source IC 103A or first microcomputer 101A, first microcomputer 101A is reset even if the voltage at the output end of first power source connector 102A is normal voltage.

When first microcomputer 101A is reset, the output of first torque sensor 104A becomes abnormal, and further, communication between second microcomputer 101B and first microcomputer 101A becomes abnormal.

On the other hand, second microcomputer 101B detects the voltage at the output end of first power source connector 102A is normal voltage using second voltage monitoring line 111B.

That is, at time t1, second microcomputer 101B determines that the abnormality determination conditions, specifically, the voltage at the output end of first power source connector 102A being normal, communication with first microcomputer 101A being abnormal, and the output signal of first torque sensor 104A being abnormal, are satisfied. Then, second microcomputer 101B starts addition processing of abnormality counter C1 from time t1 to measure the continued time during which the abnormality determination conditions are satisfied, and when the continued time reaches a predetermined time at time t2, second microcomputer 101B confirms the reset state of first microcomputer 101A due to abnormality of first power source IC 103A or first microcomputer 101A.

Figure 7:
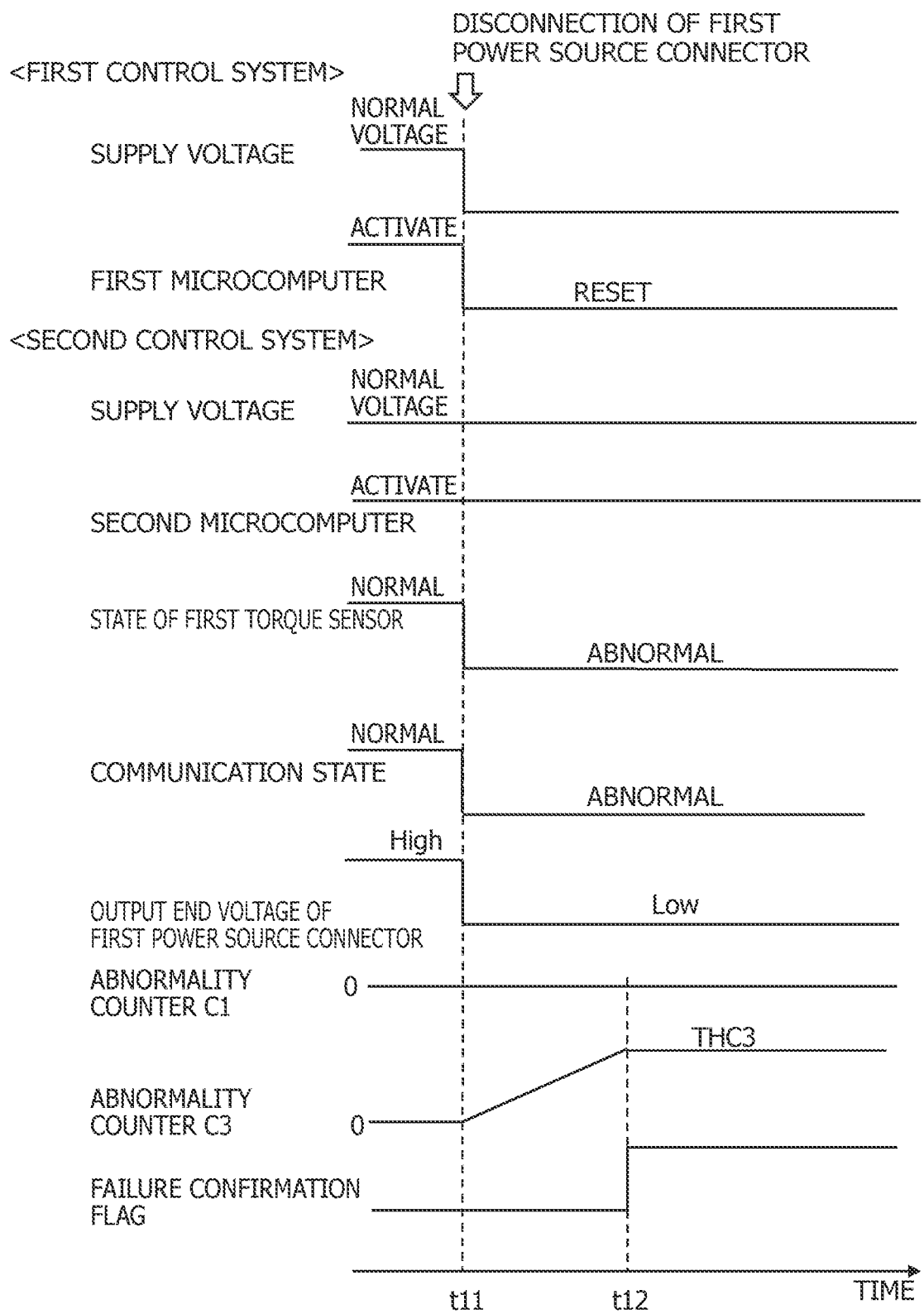
FIG. 7 is a time chart illustrating diagnosis by a second voltage fluctuation confirmation unit.

FIG. 7 is a time chart illustrating diagnosis by second microcomputer 101B, or more specifically, by second voltage fluctuation confirmation unit 101B2, when the voltage at the output end of first power source connector 102A has become lower than normal voltage due to disconnection of first power source connector 102A and first microcomputer 101A has been reset as a consequence.

At time t11, when first power source connector 102A is disconnected, the voltage at the output end of first power source connector 102A drops, and as a consequence, first microcomputer 101A is reset.

When first microcomputer 101A is reset, the output of first torque sensor 104A becomes abnormal, and furthermore, communication between second microcomputer 101B and first microcomputer 101A becomes abnormal.

On the other hand, second microcomputer 101B detects that the voltage at the output end of first power source connector 102A is lower than normal voltage using second voltage monitoring line 111B.

That is, at time t11, second microcomputer 101B determines that the abnormality determination conditions, which is specifically, the voltage at the output end of first power source connector 102A being abnormal, communication with first microcomputer 101A being abnormal, and the output signal of first torque sensor 104A being abnormal, are satisfied, or in other words, the determination conditions for resetting due to voltage fluctuation are satisfied.

Then, second microcomputer 101B starts addition processing of abnormality counter C3 from time t11 to measure the continued time during which the abnormality determination conditions are satisfied, and when the continued time reaches a predetermined time at time t12, second microcomputer 101B confirms the reset state of first microcomputer 101A due to fluctuation of voltage supplied to first microcomputer 101A.

Figure 8:
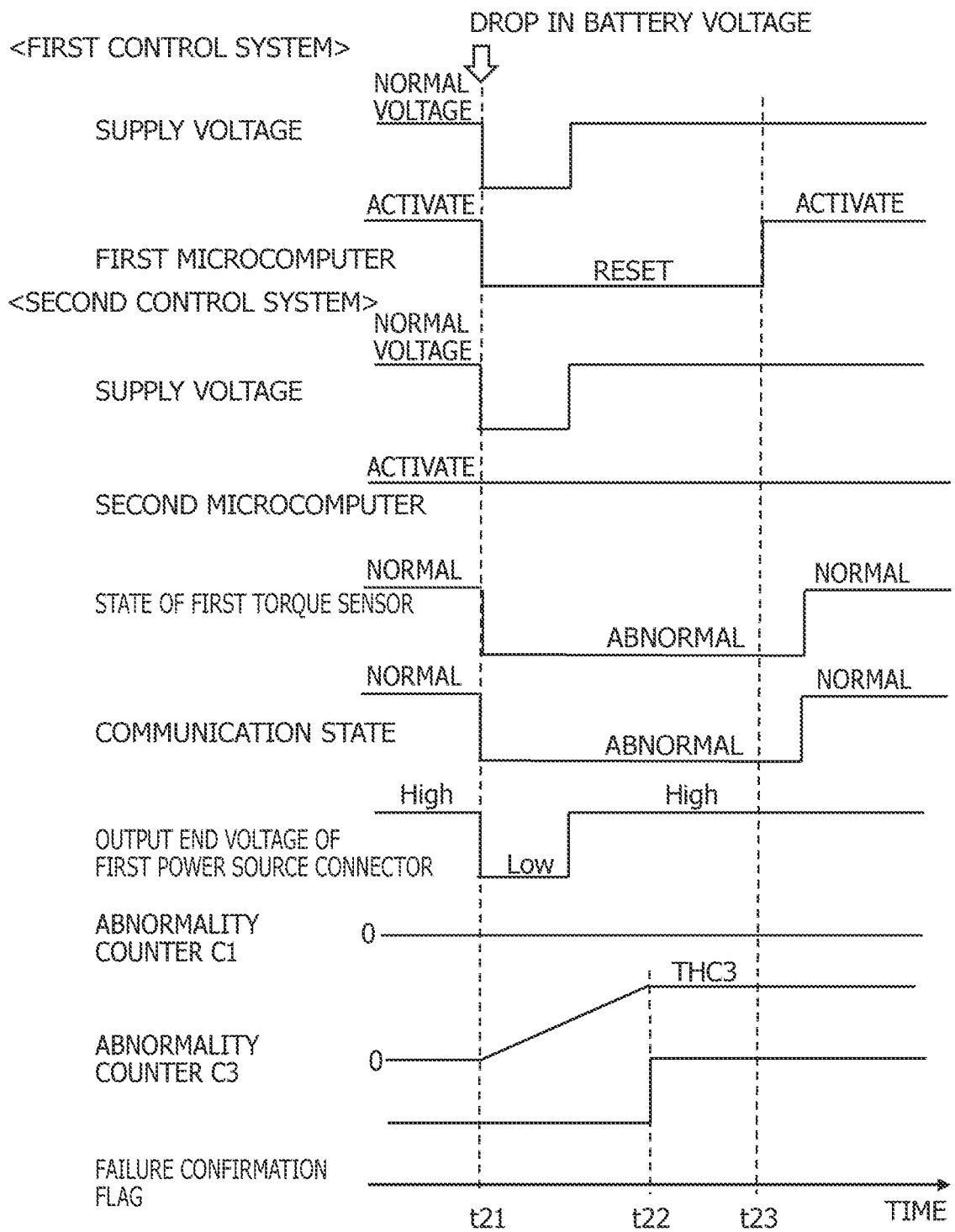
FIG. 8 is a time chart illustrating diagnosis by the second voltage fluctuation confirmation unit.

FIG. 8 is a time chart illustrating diagnosis by second microcomputer 101B, or more specifically, by second voltage fluctuation confirmation unit 101B2, when the voltage at the output end of first power source connector 102A has become lower than normal voltage due to a voltage drop in battery 300 and first microcomputer 101A has been reset as a consequence.

Note that the time chart of FIG. 8 illustrates diagnosis by second microcomputer 101B in a case in which the voltage drop in battery 300 has reset first microcomputer 101A but has not reset second microcomputer 101B.

At time t21, when a voltage drop occurs in battery 300, the voltage at the output end of first power source connector 102A drops, and as a consequence, first microcomputer 101A is reset.

When first microcomputer 101A is reset, the output of first torque sensor 104A becomes abnormal, and furthermore, communication between second microcomputer 101B and first microcomputer 101A becomes abnormal.

On the other hand, second microcomputer 101B detects that the voltage at the output end of first power source connector 102A is lower than normal voltage using second voltage monitoring line 111B.

That is, at time t21, second microcomputer 101B determines that the abnormality determination conditions, specifically, an abnormal state of low voltage at the output end of first power source connector 102A, communication with first microcomputer 101A being abnormal, and the output signal of first torque sensor 104A being abnormal, are satisfied, or in other words, the determination conditions for resetting due to voltage fluctuation are satisfied. Second microcomputer 101B starts addition processing of abnormality counter C3 from time t21 to measure the continued time during which the abnormality determination conditions are satisfied, and when the continued time reaches a predetermined time at time t22, second microcomputer 101B confirms the reset state of first microcomputer 101A due to fluctuation of voltage supplied to first microcomputer 101A.

Here, in a case in which the voltage drop in battery 300 is temporary, recovery of the voltage of battery 300 will cause the voltage at the output end of first power source connector 102A to rise to normal voltage, and first microcomputer 101A will be activated at time t23. Then, when first microcomputer 101A is activated, second microcomputer 101B is allowed to communicate normally with first microcomputer 101A, and the output signal of first torque sensor 104A returns to normal.

At this time, when determining that the voltage at the output end of first power source connector 102A is in normal voltage, communication with first microcomputer 101A is normal, and the output signal of first torque sensor 104A is normal, second microcomputer 101B starts addition processing of normality counter C5.

Then, when the continued time after returning to the normal state of first control system 100A reaches a predetermined time, second microcomputer 101B clears the confirmation flag of resetting due to voltage fluctuation and confirms recovery to the normal state.

As described above, both first microcomputer 101A and second microcomputer 101B can distinguish between resetting of the other microcomputer due to abnormality of the power source IC or the like and resetting of the other microcomputer due to disconnection of the power source connector or the like. In accordance with such distinction, first microcomputer 101A and second microcomputer 101B can switch control of the steering assist power in electric power steering system 200.

Hereinbelow, a mode of control of steering assist power when one of first microcomputer 101A and second microcomputer 101B is reset will be described.

Figure 9:
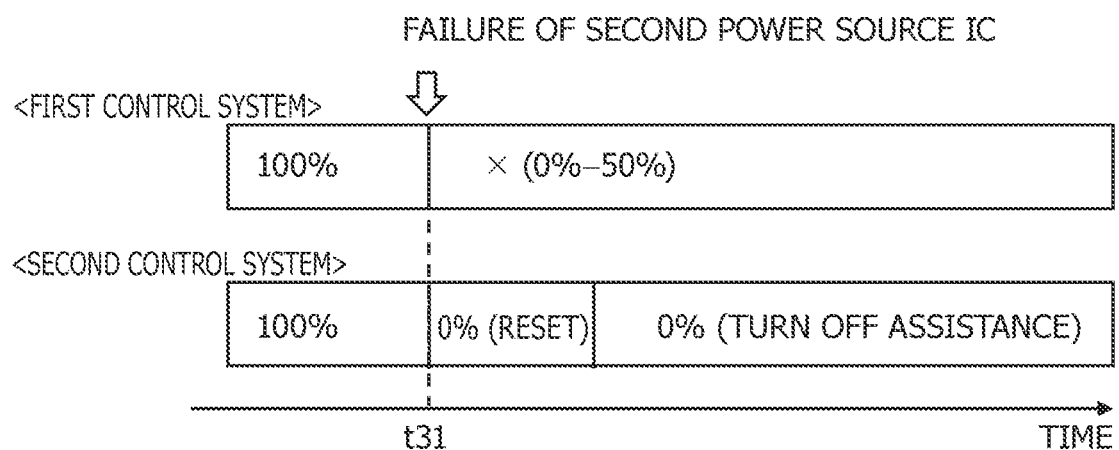
FIG. 9 is a time chart illustrating control of steering assist power when a second power source IC fails.

FIG. 9 is a time chart illustrating control of steering assist power when first microcomputer 101A diagnoses a reset state of second microcomputer 101B due to abnormality of second power source IC 103B or second microcomputer 101B.

When confirming at time t31 that second microcomputer 101B has been reset due to abnormality of second power source IC 103B or second microcomputer 101B, first microcomputer 101A outputs a control command to set power supplied to first winding set 210A to be 100% or less of normal power.

Here, first microcomputer 101A can reduce the power supplied to first winding set 210A to less than 100%, such as 0% to 50%, of normal power.

Thus, when abnormality of second power source IC 103B or second microcomputer 101B occurs, power supplied to first winding set 210A can be set to be lower than normal power and steering assist power can be reduced intentionally. As a result, it is possible to notify the driver of a failed state in which generation of steering assist power by second control system 100B is stopped, even with a slight steer.

Note, however, that first microcomputer 101A can maintain the power supplied to first winding set 210A at 100% or more than 100% of normal power.

Moreover, when abnormality of second power source IC 103B or second microcomputer 101B is confirmed, second microcomputer 101B maintains the power supplied to second winding set 210B at 0% of normal power, that is, keeps energization of second winding set 210B stopped.

As a result, it is possible to prevent vibration of steering assist power even when second microcomputer 101B is reset repeatedly.

Additionally, first microcomputer 101A can gradually reduce the power supplied to first winding set 210A from 100% or less of normal power.

For example, first microcomputer 101A can gradually reduce the power supplied to first winding set 210A from 100% of normal power, or can reduce the power supplied to first winding set 210A from 100% of normal power to a set value of less than 100% in a stepwise manner, and then gradually reduce the power from the set value.

As a result, when the steering assist power is reduced due to failure of second control system 100B, it is possible to make the driver recognize the occurrence of failure in electric power steering system 200, or in other words, deterioration of steering assist power while reducing discomfort of the driver.

Note that when diagnosing the reset state of first microcomputer 101A due to abnormality of first power source IC 103A or first microcomputer 101A, second microcomputer 101B controls the power supplied to second winding set 210B to be 100% or less, such as 0% to 50% of normal power.

Moreover, second microcomputer 101B can gradually reduce the power supplied to second winding set 210B from 100% or less of normal power.

Figure 10:
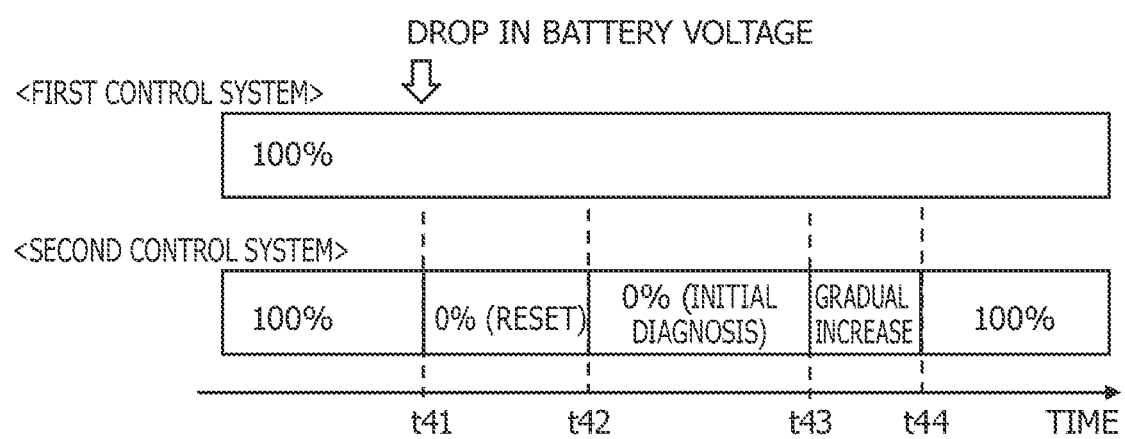
FIG. 10 is a time chart illustrating control of steering assist power when the voltage of a battery drops.

FIG. 10 is a time chart illustrating control of steering assist power when first microcomputer 101A diagnoses a reset state of second microcomputer 101B due to voltage abnormality at the output end of second power source connector 102B, or in other words, voltage fluctuation.

When confirming at time t41 that second microcomputer 101B has been reset due to voltage abnormality at the output end of second power source connector 102B, or in other words, voltage fluctuation, even after this time point, first microcomputer 101A maintains the power supplied to first winding set 210A at 100% of normal power, or in other words, at the same power as normal power.

On the other hand, second microcomputer 101B that has been reset due to voltage abnormality, or in other words, voltage fluctuation stops energization of second winding set 210B.

That is, when second microcomputer 101B is reset due to a voltage drop in battery 300 or an external cause such as a break or disconnection of second power source connector 102B, first microcomputer 101A maintaining the activated state controls power supply to first winding set 210A normally, or in other words, in the same manner as when second microcomputer 101B is also normally activated.

As described above, even when second microcomputer 101B is reset due to low voltage, first microcomputer 101A that is not reset can maintain the power supplied to first winding set 210A at 100% of normal power and avoid sudden stoppage of steering assist power generation.

Then, when the voltage at the output end of second power source connector 102B, or in other words, voltage supplied to second microcomputer 101B, returns to normal and is maintained for a predetermined period, first microcomputer 101A cancels the confirmation of voltage fluctuation.

When the voltage supply returns to normal and second microcomputer 101B is activated, second microcomputer 101B executes initial diagnosis from time t42 to time t43. Thereafter, second microcomputer 101B gradually increases the power supplied to second winding set 210B from time t43 to time t44 up to 100% of normal power, and recovers the normal level of steering assist power.

The technical concepts described in the above embodiment may be used in combination as necessary, as long as no conflict arises.

While the details of the present invention are specifically described referring to the preferred embodiment, it is obvious for one skilled in the art to be able to make various modifications on the basis of the basic technical concept and teachings of the present invention.

The vehicle-mounted equipment is any vehicle-mounted equipment controlled by a redundant electronic control device that includes first microcomputer 101A and second microcomputer 101B, and is not limited to electric power steering system 200.

Moreover, in the vehicle-mounted equipment, the control target to be controlled by first microcomputer 101A and second microcomputer 101B is not limited to an electric motor.

The system may include a first battery and a second battery, and may have the first battery connected to first power source connector 102A and the second battery connected to second power source connector 102B.

The first sensor and second sensor used by first microcomputer 101A and second microcomputer 101B for diagnostic processing of abnormality confirmation and voltage fluctuation confirmation are not limited to first torque sensor 104A and second torque sensor 104B.

For example, in an electric power steering system 200 including a first rotation angle sensor and a second rotation angle sensor as rotation angle sensors for detecting the rotation angle of an electric motor 210, a first microcomputer 101A and a second microcomputer 101B can execute diagnostic processing for confirming abnormality and confirming voltage fluctuation on the basis of detection signals from the first rotation angle sensor and the second rotation angle sensor in response to command signals as transmission requests.

Alternatively, in an electric power steering system 200 including a first steering angle sensor and a second steering angle sensor as steering angle sensor for detecting the steering angle which is the tire-steer-angle, a first microcomputer 101A and a second microcomputer 101B can execute diagnostic processing for confirming abnormality and confirming voltage fluctuation on the basis of detection signals from the first steering angle sensor and the second steering angle sensor in response to command signals as transmission requests.

Moreover, first microcomputer 101A and second microcomputer 101B can acquire, as information for determining whether or not the other microcomputer is in a reset state, a control command of a pre-driver controlling an inverter from the other microcomputer.

Specifically, first microcomputer 101A acquires a control command of a second pre-driver 105B controlling a second inverter 106B connected to a second winding set 210B from second microcomputer 101B, and second microcomputer 101B acquires a control command of a first pre-driver 105A controlling a first inverter 106A connected to first winding set 210A from first microcomputer 101A.

Then, first microcomputer 101A determines that second microcomputer 101B has been reset on the basis of abnormality of the control command of second pre-driver 105B, and second microcomputer 101B determines that first microcomputer 101A has been reset on the basis of abnormality of the control command of first pre-driver 105A.

Note that first microcomputer 101A and second microcomputer 101B can detect activation and resetting of the other microcomputer from at least one of the state of control command of the pre-driver, the state of a sensor, and the state of communication between the microcomputers to execute diagnostic processing for confirming abnormality and confirming voltage fluctuation.

Moreover, since first microcomputer 101A and second microcomputer 101B are connected to in-vehicle network 400, first microcomputer 101A can grasp the information acquisition state of second microcomputer 101B via in-vehicle network 400, and second microcomputer 101B can grasp the information acquisition state of first microcomputer 101A via in-vehicle network 400.

Then, first microcomputer 101A and second microcomputer 101B can determine whether or not the other microcomputer has been reset on the basis of whether or not the information acquisition state of the other microcomputer via in-vehicle network 400 is normal.

That is, first microcomputer 101A and second microcomputer 101B can determine the operation state of the other microcomputer from at least one of information acquisition state via in-vehicle network 400, the state of control command of the pre-driver, the state of a sensor, and the state of communication between the microcomputers to execute diagnostic processing for confirming abnormality and confirming voltage fluctuation.

As described above, first microcomputer 101A and second microcomputer 101B can execute diagnostic processing for confirming abnormality and confirming voltage fluctuation on the basis of information and signals that vary depending on whether the other microcomputer is activated or reset, and the voltage at the output end of the power source connector of the other microcomputer.

Furthermore, when one of first microcomputer 101A and second microcomputer 101B is reset due to voltage fluctuation of battery 300 or the like, the operating microcomputer can increase the power supplied to its own winding set to a value exceeding 100% of normal power, and curb the drop in steering assist power during deterioration of the voltage of battery 300.

Here, the microcomputer maintaining the active state can gradually increase the supplied power when increasing the power supplied to its own winding set to a value exceeding 100% of normal power.

REFERENCE SYMBOL LIST

100 Electronic control device
100A First control system
100B Second control system
101A First microcomputer
101B Second microcomputer
102A First power source connector
101A1 First abnormality confirmation unit
101A2 First voltage fluctuation confirmation unit
101B1 Second abnormality confirmation unit
101B2 Second voltage fluctuation confirmation unit
102B Second power source connector
103A First power source IC (first power supply circuit)
103B Second power source IC (second power supply circuit)
104A First torque sensor (first sensor)
104B Second torque sensor (second sensor)
105A First pre-driver
105B Second pre-driver
106A First inverter
106B Second inverter
111A First voltage monitoring line
111B Second voltage monitoring line
200 Electric power steering system (vehicle-mounted equipment)
210 Electric motor
210A First winding set
210B Second winding set
300 Battery (power source)
400 In-vehicle network

The invention claimed is:

1. An electronic control device for vehicle-mounted equipment, comprising:
a first power source connector and a second power source connector that connect to a power source;
a control unit that controls the vehicle-mounted equipment, the control unit including a first microcomputer that operates by receiving power supply through the first power source connector, and a second microcomputer that operates by receiving power supply through the second power source connector;
a first voltage monitoring line that connects an output end of the second power source connector and the first microcomputer;
a second voltage monitoring line that connects an output end of the first power source connector and the second microcomputer;
a sensor unit that can detect a physical quantity of the vehicle-mounted equipment, the sensor unit including a first sensor that operates according to a command from the first microcomputer, and a second sensor that operates according to a command from the second microcomputer;
a first power supply circuit that converts a source voltage into an operating voltage of the first microcomputer and supplies the operating voltage to the first microcomputer; and
a second power supply circuit that converts a source voltage into an operating voltage of the second microcomputer and supplies the operating voltage to the second microcomputer, wherein:
the first microcomputer and the second microcomputer can communicate with each other,
the first microcomputer acquires a detection signal from the first sensor and a detection signal from the second sensor,
the first microcomputer includes a first abnormality confirmation unit that confirms abnormality of the second microcomputer or the second power supply circuit, and a first voltage fluctuation confirmation unit that confirms fluctuation of a voltage supplied to the second microcomputer,
the second microcomputer acquires a detection signal from the first sensor and a detection signal from the second sensor,
and
the second microcomputer includes a second abnormality confirmation unit that confirms abnormality of the first microcomputer or the first power supply circuit, and a second voltage fluctuation confirmation unit that confirms fluctuation of a voltage supplied to the first microcomputer.

2. The electronic control device for vehicle-mounted equipment according to claim 1, wherein:
the vehicle-mounted equipment includes an electric motor having a first winding set and a second winding set,
driving of the first winding set is controlled by a control command from the first microcomputer, and driving of the second winding set is controlled by a control command from the second microcomputer,
when the first abnormality confirmation unit confirms abnormality of the second microcomputer or the second power supply circuit, the first microcomputer outputs a control command for setting power supplied to the first winding set to be 100% or less, and
when the second abnormality confirmation unit confirms occurrence of abnormality of the first microcomputer or the first power supply circuit, the second microcomputer outputs a control command for setting power supplied to the second winding set to be 100% or less.

3. The electronic control device for vehicle-mounted equipment according to claim 2, wherein:
when the first abnormality confirmation unit confirms abnormality of the second microcomputer or the second power supply circuit, the first microcomputer outputs a control command for gradually reducing power supplied to the first winding set from 100% or less, and
when the second abnormality confirmation unit confirms occurrence of abnormality of the first microcomputer or the first power supply circuit, the second microcomputer outputs a control command for gradually reducing power supplied to the second winding set from 100% or less.

4. The electronic control device for vehicle-mounted equipment according to claim 1, wherein:
the vehicle-mounted equipment includes an electric motor having a first winding set and a second winding set, driving of the first winding set is controlled by a control command from the first microcomputer, and driving of the second winding set is controlled by a control command from the second microcomputer, when the first voltage fluctuation confirmation unit confirms fluctuation of a voltage supplied to the second microcomputer, the first microcomputer outputs a control command for maintaining power supplied to the first winding set at 100%, and when the second voltage fluctuation confirmation unit confirms fluctuation of a voltage supplied to the first microcomputer, the second microcomputer outputs a control command for maintaining power supplied to the second winding set at 100%.

5. The electronic control device for vehicle-mounted equipment according to claim 4, wherein:

the first voltage fluctuation confirmation unit cancels the confirmation of voltage fluctuation when the voltage supplied to the second microcomputer returns to normal and is continued for a predetermined period, and the second voltage fluctuation confirmation unit cancels the confirmation of voltage fluctuation when the voltage supplied to the first microcomputer returns to normal and is continued for a predetermined period.

6. The electronic control device for vehicle-mounted equipment according to claim 5, wherein the first microcomputer and the second microcomputer execute initial diagnosis at a time of activation after resetting.

7. The electronic control device for vehicle-mounted equipment according to claim 6, wherein:

the vehicle-mounted equipment is an electric power steering system that generates steering power by the electric motor, and the first sensor and the second sensor are torque sensors for detecting a steering torque.

8. The electronic control device for vehicle-mounted equipment according to claim 6, wherein the first sensor and the second sensor are rotation angle sensors for detecting a rotation angle of the electric motor.

9. The electronic control device for vehicle-mounted equipment according to claim 6, wherein:

the vehicle-mounted equipment is an electric power steering system that generates steering power by the electric motor, and the first sensor and the second sensor are steering angle sensors for detecting a steering angle.

10. The electronic control device for vehicle-mounted equipment according to claim 5, wherein:

the first microcomputer gradually increases power supplied to the first winding set and restores the power to 100% when activated from a reset due to voltage fluctuation, and the second microcomputer gradually increases power supplied to the second winding set and restores the power to 100% when activated from a reset due to voltage fluctuation.

11. The electronic control device for vehicle-mounted equipment according to claim 1, wherein:

the vehicle-mounted equipment includes an electric motor having a first winding set and a second winding set, driving of the first winding set is controlled by a control command from the first microcomputer, and driving of the second winding set is controlled by a control command from the second microcomputer, the first microcomputer acquires a control command of a second pre-driver that controls a second inverter connected to the second winding set from the second microcomputer, and the second microcomputer acquires a control command of a first pre-driver that controls a first inverter connected to the first winding set from the first microcomputer.

12. The electronic control device for vehicle-mounted equipment according to claim 1, wherein:

the first microcomputer and the second microcomputer are connected to an in-vehicle network, the first microcomputer grasps an information acquisition state of the second microcomputer via the in-vehicle network, and the second microcomputer grasps an information acquisition state of the first microcomputer via the in-vehicle network.

* * * * *